(No Model.)
J. M. W. LONG.
ROLLER SKATE.
No. 325,214.      Patented Aug. 25, 1885.
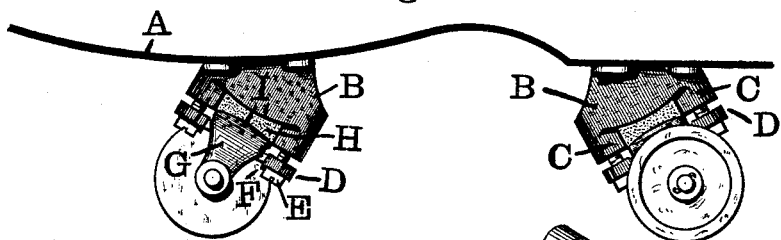
Fig. 1.
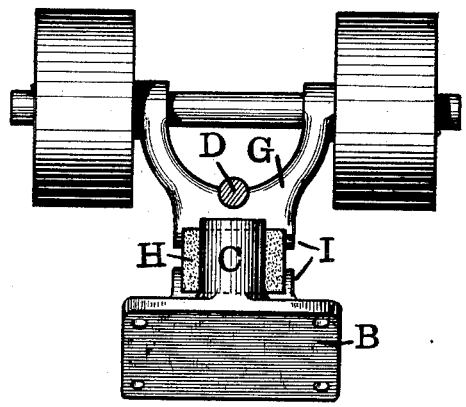
Fig. 2.
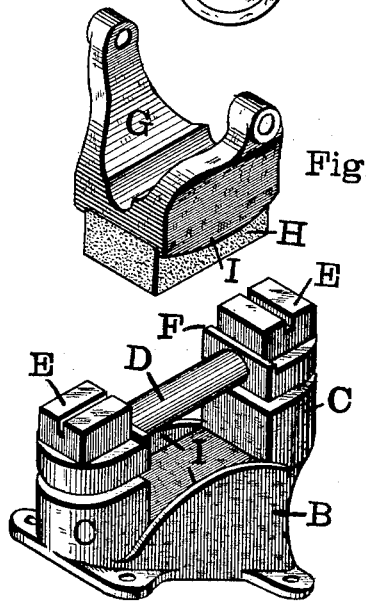
Fig. 3.
Fig. 4.
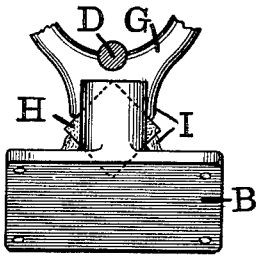
Fig. 5.
Witnesses:
W. A. Seward
N. M. Seward
John M. W. Long    Inventor
by James W. See    Attorney

UNITED STATES PATENT OFFICE.

JOHN M. W. LONG, OF HAMILTON, OHIO.

ROLLER-SKATE.

SPECIFICATION forming part of Letters Patent No. 325,214, dated August 25, 1885.

Application filed March 11, 1885. (No model.)

*To all whom it may concern:*

Be it known that I, JOHN M. W. LONG, of Hamilton, Butler county, Ohio, have invented certain new and useful Improvements in Roller-Skates, of which the following is a specification.

This invention pertains to skates for parlor, pavement, and rink use, and will be readily understood from the following description, taken in connection with the accompanying drawings, in which—

Figure 1 is a side elevation of a skate illustrating my invention, the forward left-hand wheel of the skate being omitted to expose the mechanism located between the two wheels of each truck; Fig. 2, a front view of the forward truck, the two trucks being alike, the direction of view being in the line of the axis of the rocker-bar D; Fig. 3, a perspective view, the parts being shown upside down, of one of the housings with the rubber spring in place; Fig. 4, a perspective view of one of the hangers, shown upside down, and with the rocker-bar in position; and Fig. 5, a view, similar to Fig. 2, of a modified form.

In the drawings, A represents the foot-piece of the skate; B, the truck-hangers secured thereto; C, bosses projecting downward from the hangers; D, cylindrical rocker-bars secured to the hanger-bosses; E, square-headed screws passing through eyes at the ends of the hanger-bars and serving to secure the hanger-bars to the hanger-bosses; F, a lip upon the under face of each eye of the hanger-bar; G, the housings of the wheel-axles, carrying the floor-wheels in the usual manner; H, square blocks of rubber inserted between the under faces of the hangers and the upper faces of the housings, and I side lips projecting from the faces of hangers and housings at the sides of the rubber blocks.

The rubber blocks serve as the springs of the skate. The housings are held to the hangers and to the rubber blocks by the rocker-bars D, which seat in bearings or grooves upon the under surfaces of the housings. The housings oscillate upon the rocker bars, and the rubber blocks endow the oscillating motion with elasticity and a normal tendency to maintain a central position. The weight of the skater comes mainly upon the rubber blocks, and the rocker-bar is to be so adjusted by means of screws E that the rocker-bar will be in proper contact with its bearing-groove in the housing when the spring is compressed by the weight of the skater, and the rocker-bar may be still further tightened to increase the tension. The lips F serve as keepers to prevent the screws E from rattling out of adjustment. Normally the lips prevent the screws from being turned at all; but by pressing the rocker-bar inward, and compressing the spring somewhat, the heads of the screws E are relieved from the influence of the lips F, and the screws may then be adjusted as desired, and the lips will serve to lock them at any one of their four quarters of revolution. I show the screws E as being tapped into the hanger-bosses; but, if desired, bolts may be put through the hanger-bosses, and nuts applied in place of the heads of the screws, in an obvious manner. The housing enters a trifle up into the recess between the hanger-bosses, and thus the rocker-bar is not called upon to furnish any shoulders or end bearings for the housings. The lips I serve to retain the rubber blocks in place, and at the same time serve to utilize the crosswise compression of the rubber. The rocker-bar D is arranged at an angle, as usual, so as to produce a curving tendency when the skate is tipped.

In the drawings, I show the foot-piece A as being of the struck-up sheet-metal type, and without any strappings or other foot attachments. My invention is applicable to any of the usual forms of foot-pieces.

I claim as my invention—

1. In a roller-skate, the combination of a hanger provided with a pair of downardly-projecting bosses having threaded holes in their lower ends, a housing provided with a wheel-axle and with a bearing for a transverse rocker-bar, a spring disposed between the housing and the hanger, a rocker-bar having an eye at each end, and screws serving to unite the rocker-bar to the hanger, and serving to adjust the rocker-bar bodily in its relation to the hanger, substantially as and for the purpose set forth.

2. The combination, with a hanger, housing, and spring, of the rocker-bar B, having eyes at each end, provided with lips F, and screws E with flat-sided heads engaged and prevented from being turned by the lips F, substantially as and for the purpose set forth.

JOHN M. W. LONG.

Witnesses:
J. W. SEE,
W. A. SEWARD.